Oct. 21, 1930.  F. P. TESSMER  1,778,967
WOOD WORKING UNIT
Filed Nov. 25, 1927   2 Sheets-Sheet 1
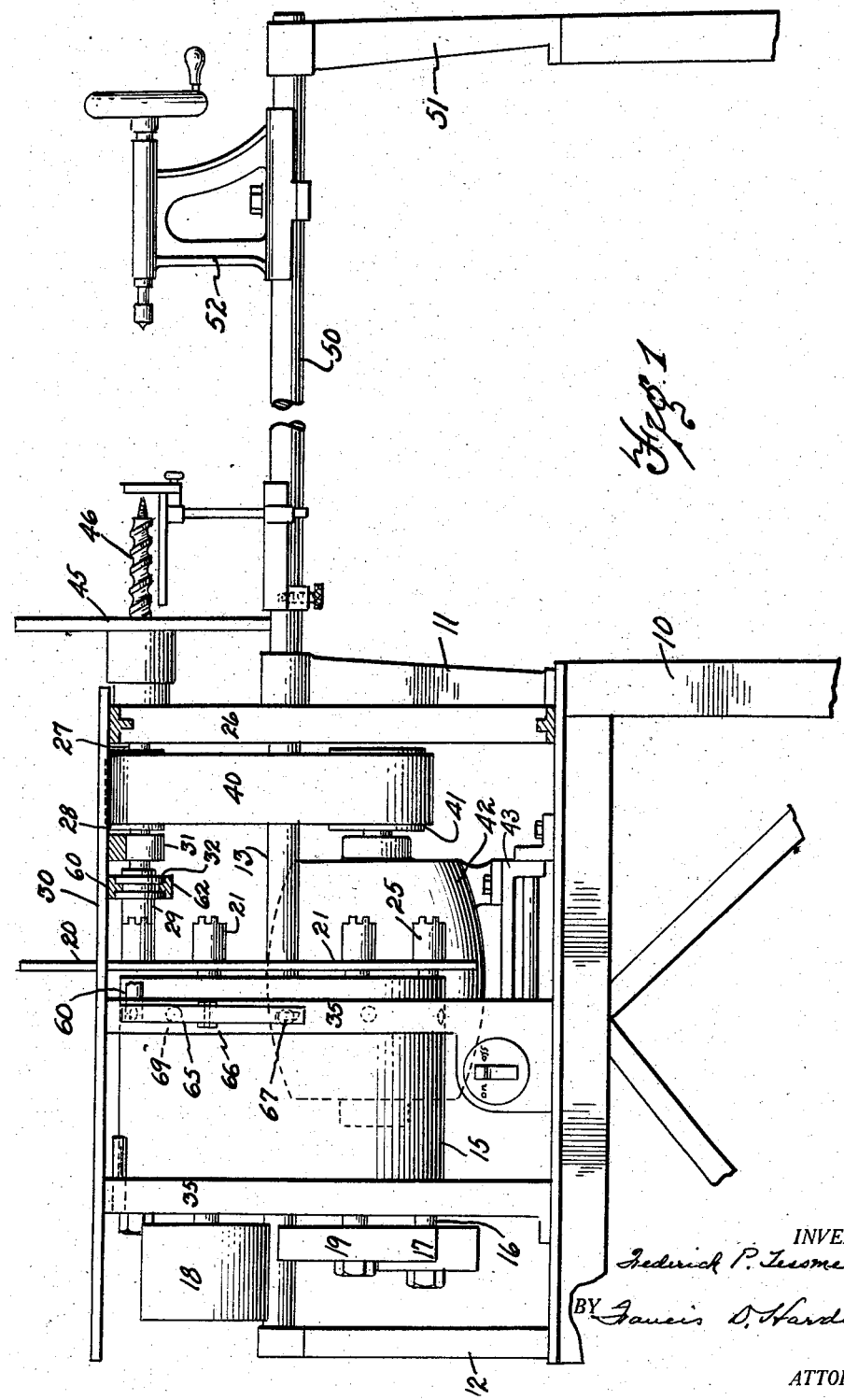
INVENTOR.
Frederick P. Tessmer
BY Francis D. Hardesty
ATTORNEY.

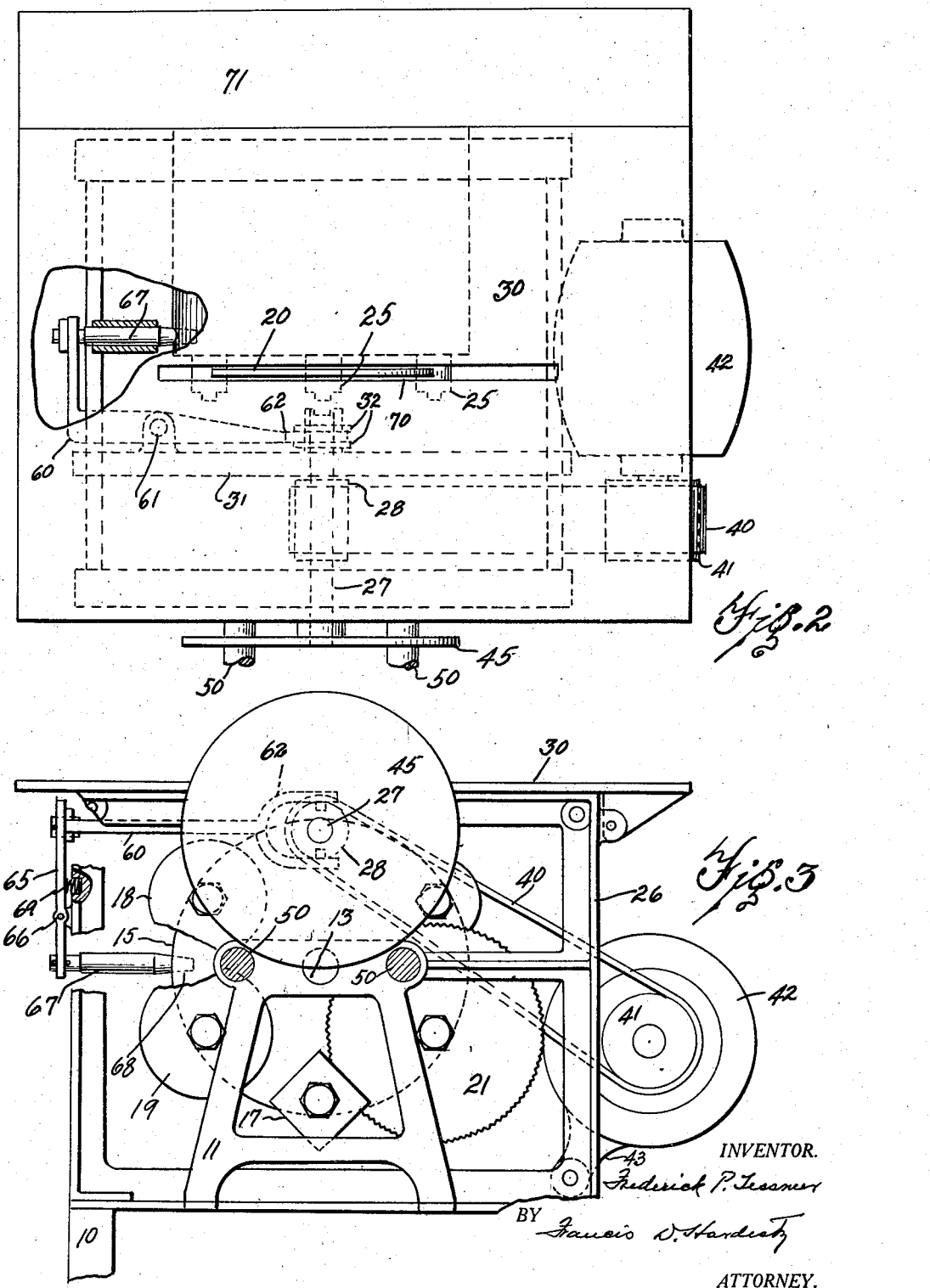

Patented Oct. 21, 1930

1,778,967

UNITED STATES PATENT OFFICE

FREDERICK P. TESSMER, OF DETROIT, MICHIGAN

WOODWORKING UNIT

Application filed November 25, 1927. Serial No. 235,455.

The present invention relates to wood working machines and more particularly to machines which are capable of carrying out a number of different operations.

Among the objects of the invention is a machine comprising a plurality of wood working devices operable independently from a single driving means, easily and quickly changed from one to another.

Another object is the arrangement of such devices in a unit which is compact, easily set up and may be made sufficiently small to be easily movable.

Other objects will readily appear to those skilled in the art upon reference to the following description and the accompanying drawings in which:—

Fig. 1 is a side elevation with parts omitted for the sake of clearness;

Fig. 2 is a plan view of the same, omitting the lathe bed and tailstock;

Fig. 3 is an end view of the device of Fig. 2.

As indicated a machine of small size comprises a table 10 upon which is mounted end frame members 11 and 12, which extend up to and support a shaft 13 carrying intermediate its ends a drum 15, mounted to rotate on or with the shaft. Drum 15 is provided in its outer peripheral portion with a plurality of bearings for longitudinal shafts 16 of which, in the construction shown, there are six. Each of the shafts carries a rotary wood cutting device, which may be of any suitable type, some of which will be at one end of the drum and the others at the other end. In the particular construction shown, 17 is a dado head, 18 is a drum sander, 19 is a grinding wheel, 20 is a cross cut saw, and 21 is a rip saw. These particular devices are given by way of example only, as other combinations may be used.

In addition to the devices mentioned, each shaft 16 at one end of the drum is provided with one member 25 of a clutch through which the selected shaft may be driven.

Mounted at one end of table 10 is a frame member 26 having in its upper portion a bearing for a drive shaft 27 provided with a pulley 28 and the other member 29 of the clutch. Frame member 26 also supports one end of a saw table 30 and the latter supports a second bearing member 31 for shaft 27. The clutch member 29 is splined on shaft 27 and provided with two peripheral shoulders 32 between which is adapted to lie a fork or slip ring for actuating the clutch member.

The table 30 may be supported at its other end by members 35.

Shaft 27 through pulley 28 is driven by means of a belt 40 from a pulley 41 carried on the shaft of an electric motor 42 which, by means of legs 43, is hinged to table 10 and so arranged that the weight of the motor serves to maintain the tightness of the belt 40.

It is preferred also to extend shaft 27 beyond frame member 26 and to provide means for attachment of a disc sander 45 which in turn may have means at its center for securing a boring bit 46 or lathe chuck (not shown). Where provision is made for lathe operations, a lathe bed is provided in two shafts or rods 50 mounted in frame member 11 at one end and in a second frame member 51 erected at a suitable distance from table 10. On these rods 50 is clamped a tailstock 52 and the usual tool rest (not shown).

The device is also preferably provided with means for properly positioning the drum 15 and such means may be combined with means for simultaneous operation of clutch member 29. The means for doing this is shown best in Figures 2 and 3 and comprises a bell crank lever 60 pivoted at 61 provided with a fork 62 lying between and cooperating with shoulders 32. The other end of lever 60 is located behind one end of a second lever 65, pivoted at 66, whose lower end carries a pin 67 extending horizontally, in suitable guides (not shown) toward drum 15 and into suitably located sockets 68 in the periphery thereof. It is preferred to taper somewhat the end of pin 67 and to provide lever 65 with a spring 69 tending to maintain the pin in the socket. It is, of course, obvious that the sockets 68 will be so located that the drum 15 will be held with one of the shafts 16 in alignment with shaft 27.

The saw table 30 will of course be provided with a slot 70 for the saws, and with a removable end 71 permitting the use of the sander 18 and also the substitution of a suitable table extension (not shown) permitting the use of the dado or jointer if the latter is used.

Now having described the invention and the preferred form of embodiment thereof it is to be understood that the said invention is to be limited not to the specific details herein set forth but only by the scope of the claims which follow.

I claim:—

1. A wood working unit comprising a table having a frame, a motor mounted thereon, a shaft in said frame having a driving connection with said motor, a plurality of wood working devices movably mounted on said frame and adapted to be moved individually at will into position to be operated by said shaft and to have its action portion project through said table whereby to act on work supported upon said table, a separable clutch and operating means therefor adapted to couple said shaft with said positioned device and means cooperating with the clutch operating means to fix the position of the device being driven.

2. A wood working unit comprising a table having a frame, a motor mounted thereon, a shaft in said frame having a driving connection with said motor, a plurality of rotary wood working devices movably mounted on said frame and provided each with one member of a clutch and adapted to be moved individually at will into position to be operated by said shaft and to have its action portion project through said table whereby to act on work supported upon said table, a cooperating clutch member on said shaft, means to bring said clutch members together whereby a driving relation is established between said shaft and one of said devices and means cooperating with the clutch operating means to fix the position of the device being driven.

3. A wood working unit comprising a support a motor thereon, a frame mounted on said support and having a shaft mounted therein in driving relation with said motor a table carried on said frame, a rotatable drum mounted in said frame on an axis parallel to the axis of said shaft and carrying a plurality of longitudinal shafts in bearings near its outer periphery, wood working devices on said shafts, means for coupling any selected one of said latter shafts to the first mentioned shaft and means cooperating with the coupling means for preventing movement of said drum when said shafts are so coupled.

FREDERICK P. TESSMER.